_United States Patent_ [19]

Phillips et al.

[11] 4,283,507

[45] Aug. 11, 1981

[54] HYDROLYSIS OF ACRYLAMIDE POLYMERS

[75] Inventors: Kenneth G. Phillips, River Forest; Mary E. Bingham, Palos Hills, both of Ill.

[73] Assignee: Nalco Chemical Company, Oak Brook, Ill.

[21] Appl. No.: 124,615

[22] Filed: Feb. 25, 1980

[51] Int. Cl.$^3$ .......................... C08F 8/34; C08F 8/42; C08F 8/44
[52] U.S. Cl. .................................... 525/344; 525/369
[58] Field of Search ............................. 525/369, 344

[56] References Cited

U.S. PATENT DOCUMENTS

| | | | |
|---|---|---|---|
| 2,812,317 | 11/1957 | Barrett | 525/369 |
| 2,861,059 | 11/1958 | Mowry | 525/369 |
| 3,029,228 | 4/1962 | Glavis | 525/369 |
| 3,442,879 | 5/1969 | Saunders et al. | 525/369 |

FOREIGN PATENT DOCUMENTS

| | | | |
|---|---|---|---|
| 2729754 | 1/1978 | Fed. Rep. of Germany | 525/369 |
| 772734 | 4/1957 | United Kingdom | 525/369 |

_Primary Examiner_—William F. Hamrock
_Attorney, Agent, or Firm_—Kinzer, Plyer, Dorn & McEachran

[57] ABSTRACT

This invention relates to a method for the hydrolysis of acrylamide polymers utilizing less than stoichiometric amounts of a hydrolysis agent selected from the group consisting of alkali metal hydroxides and alkali metal sulfites. The process is conducted with a water-in-oil emulsion (latex) of the acrylamide polymer at an elevated temperature and pressure.

3 Claims, No Drawings

HYDROLYSIS OF ACRYLAMIDE POLYMERS

INTRODUCTION

This invention concerns a method of hydrolyzing acrylamide polymers whereby some or all of the amide functionality on the acrylamide polymer is transformed to the corresponding carboxylic group which imparts anionic character. Polymers produced in accordance with this invention have been found to provide excellent results in the thickening and dewatering of industrial wastes, in secondary and tertiary oil recovery processes, in the manufacture of paper, and are also useful for the flocculation of red mud and in a variety of other applications.

The prior art including U.S. Pat. Nos. 3,637,564, 3,784,597, and 3,998,777 teaches the hydrolysis of acrylamide polymers. While the processes elicited in the above three mentioned references produce satisfactory results, problems have remained in this art. For one, often times the amount of hydrolysis agent, usually sodium hydroxide, employed has been so great that the solutions were diluted excessively and water-in-oil emulsions were rendered unstable due to the associated change in the oil/water ratio. Another problem with the prior art has been the need to employ stoichiometric or even larger than stoichiometric amounts of hydrolysis agents relative to the number of amide groups hydrolyzed. This often results in a product having a high salt content which can be undesirable in certain applications.

Accordingly, this invention is directed to a method for the hydrolysis of acrylamide polymers utilizing less than a stoichiometric amount of hydrolysis agent relative to the number of amide groups to be hydrolyzed.

THE POLYMERS OF THE INVENTION

The acrylamide polymers employed in this invention are in the form of water-in-oil emulsions. By the term acrylamide polymer as utilized in this invention is meant a water-soluble substantially linear polymer or copolymer containing acrylamide or methacrylamide. In the case of a copolymer, at least 25% by weight of the repeating groups in the polymer chain and preferably 50% by weight should be either acrylamide and/or methacrylamide. Other water-soluble comonomers with which the acrylamide or methacrylade may be polymerized in accordance with the present invention are set forth in U.S. Pat. No. 3,624,019. Collectively the homopolymers and copolymers may be referred to simply as acrylamide polymers.

The water-in-oil emulsions of acrylamide polymers are described in Vanderhoff, U.S. Pat. No. 3,284,393, and Anderson et al U.S. Pat. No. 3,624,019, which are incorporated by reference herein. In general, the water-in-oil emulsions of the water-soluble acrylamide polymers useful in this invention contain four basic components. These components and their weight percentage in the emulsions are listed below:

A. Water soluble acrylamide polymer:
1. Generally from 5–60%;
2. Preferably from 20–40%; and
3. Most preferably from 25–35%;

B. Water:
1. Generally from 20–90%;
2. Preferably from 20–70%; and
3. Most preferably from 30–55%;

C. Hydrophobic liquid:
1. Generally from 5–75%;
2. Preferably from 5–40%; and
3. Most preferably from 20–30%; and D. Water-in-oil emulsifying agent:
1. Generally from 0.1–21%;
2. Preferably from 1–15%;
3. Most preferably from 1.2–10%.

It is also possible to further characterize the water-in-oil emulsions of water soluble acrylamide polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

The Hydrophobic Liquids

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the trade name "Isopar M" described in U.S. Pat. No. 3,624,019 and a paraffinic solvent sold by the Exxon Company, U.S.A. called "Low Odor Paraffinic Solvent." Typical specifications of this material are set forth below in Table I.

TABLE I

| | |
|---|---|
| Specific Gravity 60°/60° F. | 0.780–0.806 |
| Color, Saybolt | + 30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benezene, xylene, toluene, and other water immiscible hydrocarbons having low flash points or toxic properties are generally avoided due to problems associated with their handling.

The Water-in-Oil Emulsifying Agents

While any conventional water-in-oil emulsifying agent can be used, such as sorbitan monooleate, sorbitan monooleate and the so-called low HLB materials, alkali stable surfactants such as those disclosed in U.S. Pat. No. 3,998,777, which is incorporated by reference herein, are preferred. When utilizing surfactants in the preparation of the initial acrylamide polymer emulsion, an alkali stable surfactant will in most cases have to be added to preserve the character of the emulsion during the hydrolysis step. The emulsifier preferred in this application is formed by the reaction of an aliphatic hydrocarbon alcohol having 10–20 carbon atoms with 2–10 moles of ethylene oxide per mole of alcohol. Preferably the alcohol will have from 12–18 carbon atoms and will be reacted with from 2–4 moles of ethylene oxide per mole of alcohol. A preferred material sold under the trade name BRIJ 92 available from the ICI United States, Inc. is a polyoxyethylene (2) oleyl alcohol. It is within the spirit and intent of this invention that other alkali stable water-in-oil emulsifiers can, of course, be utilized in practice.

The Preparation of the Water-in-Oil Emulsions of Water Soluble Vinyl Addition Polymers The general method for the preparation of emulsions of the type described above is contained in Vanderhoff, U.S. Pat. No. 3,284,393, which is incorporated by reference herein. A typical procedure for preparing water-in-oil emulsions of this type includes preparing an aqueous solution of a water-soluble acrylamide monomer and adding this solution to one of the hydrocarbon oils described above. With the addition of a suitable water-in-oil emulsifying agent and under agitation, the emulsion is then subjected to free radical polymerization conditions and a water-in-oil emulsion of the water-soluble acrylamide polymer is obtained. It should be pointed out that the ingredients are chosen based upon the weight percentages given above and their compatability with each other. As to choice of free radical catalyst, these materials may be either oil or water soluble and may be from the group consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. Nos. 3,624,019, Re. 28,474, 3,734,873, Re. 28,576, 3,826,771, all of which are incorporated by reference herein, the use of air may be employed to control polymerization. This technique is described in U.S. Pat. No. 3,767,629 which is also incorporated by reference herein.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest is U.S. Pat. No. 3,997,492 which describes the formation of water-in-oil emulsions of the type above described utilizing emulsifiers having HLB values of between 4–9.

Physical Properties of The Water-in-Oil Emulsions

The water-in-oil emulsions of the finely divided water-soluble polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, i.e., pumpable.

The Inversion of the Water-in-Oil Emulsions of the Water Soluble Acrylamide Polymers The water-in-oil emulsions of the water-soluble polymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019 incorporated by reference. As stated in the Anderson reference, the polymer-containing emulsions may be inverted by any number of means. The most convenient means resides in the use of a surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50 percent based on the polymer. Good inversion often occurs within the range of 1.0–10 percent based on polymer.

The preferred surfactants utilized to cause the inversion of the water-in-oil emulsion of this invention when the emulsion is added to water are hydrophillic and are further characterized as being water soluble. Any hydrophillic type surfactant such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8-15 moles of ethylene oxide. A more complete list of surfactants used to invert the emulsion are found in Anderson U.S. Pat. No. 3,624,019 at columns 4 and 5.

The Hydrolysis Step

In the hydrolysis step of the present invention it has been surprising that less than a stoichiometric amount of hydrolysis agent can be employed to obtain satisfactory products. Hydrolysis agents which are useful in this invention include the alkali metal hydroxides and especially sodium hydroxide and the alkali metal sulfites, especially sodium sulfite. Mixtures of alkali metal hydroxides and alkali metal sulfites can be utilized.

In the practice of the hydrolysis step of the instant invention a substoichiometric amount of the hydrolysis agent, generally in the form of an aqueous solution having dissolved therein the hydrolysis agent, is added to the dilute solution of water-in-oil emulsion of the acrylamide polymer. It is to be noted that the correlation between the molar quantity of hydrolysis agent added to the number of moles of hydrolysis (anionic content) obtained is not linear and thus while five mole percentage of hydrolysis agent should generally be added to obtain a hydrolysis level of twenty-five percent, when fifty percent hydrolysis level is to be achieved twenty mole percentage of hydrolysis agent may be employed. Thus, the counter ion (the cation) is apparently a mixture of ammonium and sodium ions.

EXAMPLE 1

Preparing a Polyacrylamide

This example describes the preparation of a water-in-oil emulsion of polyacrylamide.

To a reactor equipped with stirrer, thermometer, an inlet for adding nitrogen, and an addition funnel was added 15 parts by weight of Alkaterge T, a substituted oxazoline available from Commercial Solvents Corp. The reactor was heated to approximately 50° C. to melt the Alkaterge T after which 285.5 parts of Low Odor Paraffinic Solvent previously described was added. With stirring, the flask was purged with nitrogen to remove oxygen.

Monomer solution containing 28.06 parts of acrylamide monomer dissolved in 31.64 parts water along with a small amount of ethylene diamine tetraacetic acid was then prepared. This monomer solution was then added to the Low Odor Paraffinic Solvent-emulsifier mixture present in the flask with stirring. After a suitable emulsion had been formed 0.25 parts of Vazo 64 (azo bis-butyronitile) and 0.06 parts of Vazo 52, which is azo bis 2,4 dimethyl valeronitrile, were then added. With nitrogen purging, heat was applied to the reactor while stirring at 1000 rpm. The reactor was heated to 42° C. at which time an exothermic reaction began. The material was held at a temperature of between 42°-48° C. for a total of five hours, after which time the temperature was raised to 57° C. for an additional hour. The resultant product had an intrinsic viscosity of 17.9 and contained 0.9% residual unpolymerized acrylamide.

EXAMPLE 2

763 Grams of the polymer prepared in Example 1 was added to a suitable autoclave reaction vessel equipped with a stirrer. To this material was added 10.6 grams of Brij 92, earlier described, along with 23.5 grams of 50% caustic. With suitable mixing, the autoclave was heated to 125° C. and nitrogen gas under pressure was admitted to achieve a reaction pressure of 80 psig. The reaction was maintained at this setting for four hours after which time it was allowed to cool and remain overnight. A colloid titration of the final product showed 24% hydrolysis.

It is significant to note that there are approximately 3 moles of amide functionality in the polymer but only 0.29 moles of sodium hydroxide were added; approximately 0.7 moles of carboxyl functionality were formed.

The ratio of caustic to polyacrylamide should theoretically produce only 10% hydrolysis but colloid titration showed an additional 14%.

EXAMPLE 3

The procedure of Example 2 was followed utilizing 754.6 grams of the water-in-oil emulsion of Example 1, 10.6 grams Brij 92 and 23.5 grams of 50% NaOH. The materials were heated in an autoclave operating at 125° C. and nitrogen was introduced to generate a pressure of 250 psig. Samples were taken every half hour. At the end of four hours, colloid titration indicated an anionic content of 24 mole percentage of the starting amide group so that the unexpected result was similar to Example 2.

EXAMPLE 4

763 Grams of the polymer prepared on Example 1, 10.6 grams Brij 92 and 47.04 grams of a 50% aqueous solution of sodium hydroxide (20 mole percent caustic) were combined. The material was added to an autoclave and heated to a temperature of 125° C. under 250 psig. (N$_2$). After 2½ days at this temperature and pressure, colloid titration data showed approximately 50% hydrolysis again indicating considerably more anionic function than the molar amount of caustic used.

EXAMPLE 5

736 Grams of the polymer of Example 1 was combined with 10.6 grams Brij 92 and 47.0 grams of a 50% aqueous solution of sodium hydroxide equivalent to 20 mole percent. The mixture was added to an autoclave and maintained at a temperature of 125°±5 of pressure of 220 psig. for five hours. After five hours, the reaction was discontinued and the product analyzed. Approximately 52% of the starting amide functionality was found to be carboxylated with only 20 mole percent caustic.

EXAMPLE 6

368 Grams of the polymer of Example 1 was combined with 5.3 grams Brij 92 and 23.52 grams of 50% NaOH. This material was added to an autoclave and maintained at a pressure of 220 psig. and a temperature of from 107°-130° C. for a total of four hours and twenty minutes. After this time the reactor was cooled and the polymer analyzed. There was utilized 20% of the theoretical sodium hydroxide necessary for complete hydrolysis but 46.4% hydrolysis was observed by colloid titration.

EXAMPLE 7

746 Grams of Example 1 polymer was added to an autoclave equipped with a stirrer and to this was added 18.1 grams of anhydrous sodium sulfite while stirring. The autoclave was heated to 115° C. and a pressure (nitrogen blanket) of 100 psig. was applied. These conditions were maintained for 4.5 hours after which the contents were allowed to cool. Colloid titration of the product indicated 20% arcylate content resulting from any five mole percent of sulfite.

This example shows that under mild conditions of a hydrolysis (sulfite rather than caustic) it is not necessary to employ a surfactant such as BRIJ 92 to prevent the latex from being broken.

The following examples may be easily understood in light of the foregoing and are included to show further examples of the sulfite ion and mixtures with caustic:

TABLE II

| Example | Mole % SO$_3$ion | °C. | PSIG | I.V. (1) | I.V. (2) | % Charge (3) |
|---|---|---|---|---|---|---|
| 8 | 2.5 | 125 | 100 | 16.9 | 32.7 | 11 |
| 9 | 7.5 | 125 | 100 | 16.9 | 29.5 | 25.5 |
| 10 | Blank* | 125 | 200 | 16.9 | 17.1 | 6.3 |
| 11 | 5.0 | 125 | 100 | 16.9 | 18.9 | 25.0 |
| 12 | 7.5 | 110 | 100 | 16.9 | — | 24.7 |
| | Mole % (a) NaOH (b) SO$_3$ion | | | | | |
| 13 | (a) 10 (b) 2 | 125 | 200 | 16 | 29.3 | 23.7 |
| 14 | (a) 10 (b) 2 | 125 | 200 | 16 | 27.6 | 30.0 |
| 15 | (a) 5 (b) 2 | 125 | 200 | 16 | 27.1 | 23.3 |

(1)Intrinsic Viscosity of unhydrolyzed polyacrylamide
(2)Intrinsic Viscosity of hydrolyzed polyacrylamide product
(3)Mole percent hydrolyzed by measurement
*Example 1

Since quantitatively more anionic (carboxylic) character is developed in the polymer than the stoichiometric amount of hydrolyzing agent employed, it must be that some of the amide groups (.COONH$_2$) are converted to .COO$^-$Na$^+$ while others are converted to .COO$^-$NH$_4{}^+$, in the instance of caustic; in the instance of the sulfite there would be a mixture of .COO$^-$NH$_4{}^+$ and .COO$^-$SO$_3$H$^+$. Apparently the increased "yield" is due to the high temperature of reaction (where 125° C. is preferred) while imposing an internal pressure in the vapor space above the reaction mixture sufficient to suppress boiling which assures integrity of the latex, that is, the emulsion is not broken by ebullition, so that the water phase in which the polymer is dissolved remains intact. There are, of course, equivalents for the caustic and sulfite functions and there are an infinite number of combinations of temperatures and pressures equivalent to those here disclosed where boiling is suppressed at the temperature being used, that is, 125° C. which is merely representative.

The embodiments of the invention in which an exclusive property or privilege is claimed are defined as follows:

1. A method of enhancing hydrolysis of an acrylamide polymer contained in a latex, employing either sodium hydroxide or sodium sulfite as a hydrolyzing agent for imparting anionic character to the polymer, comprising:
    (a) incorporating a mixture of the latex and hydrolyzing agent in a reaction vessel having a vapor space above the mixture; and
    (b) reacting the mixture at about 125° C. while maintaining a pressure in the vapor space sufficient to suppress boiling, for a time sufficient to convert amide groups to anionic character.

2. A method according to claim 1 wherein the aqueous phase of the latex is about 65–85 percent by weight and in which about 25 to 50 mole percent of the polyacrylamide is hydrolyzed respectively by 5 to 20 mole percent of the hydrolyzing agent.

3. A method according to claim 2 in which the hydrolyzing agent is caustic and in which an alkali stable emulsifying agent is added to the reaction mixture to maintain the integrity of the latex.

* * * * *